UNITED STATES PATENT OFFICE 2,501,783

WATER-SOLUBLE UREA RESINS

Willard L. Morgan, Haverford, Pa., assignor to Arnold, Hoffman & Co. Incorporated, a corporation of Rhode Island No Drawing. Application May 9, 1946, Serial No. 668,483

12 Claims. (Cl. 260—2)

This application is a continuation in part of my application Serial No. 581,329, filed March 6, 1945, which is a continuation in part of my application Serial No. 508,955 filed November 4, 1943, which is a continuation in part of my application Serial No. 380,887 filed February 27, 1941. All the above applications are now abandoned.

Stable resinous products that are water soluble and at the same time cheap and readily available have considerable uses in the arts as adhesives, binders, plasticizers, as compositions for use in coatings, back-filling and many other types of work in the paper and textile industries.

In the textile industry fabric constructions have in the past been sized by the application of starch, gelatin, and water soluble gum compositions for the purpose of applying coatings which cement down the extraneous fibers on the surface of the yarns or fabric and thereby give a greater smoothness and uniformity of appearance. In the case of warp sizing, it is particularly essential that a good surface film be prepared in order to have acceptable conditions for weaving. Proper binding of the starch is necessary to eliminate fly, breaking of the yarns and subsequent stopping of the looms. In such compositions there is also subsequently used fatty type softeners along with hygroscopic agents which are added to increase the amount of moisture retained in the starch during processing.

In U. S. Patent #1,953,741 to Bennett, July 15, 1932, water soluble resinous products have been made by reaction of glycols or polyhydric alcohols, such as ethylene glycol, diethylene glycol, etc., by reacting these with boric acid. While such products are water soluble, they have found only limited uses due to their unstability in particular, and water solutions soon after preparation become cloudy and turbid due to boric acid rapidly hydrolyzing and splitting out of the compound. The resin rapidly hydrolyzes and is soon completely destroyed, thereby limiting the utility of these products.

I have found that stable water soluble resins may be prepared which may be kept for a long time in water solution without hydrolysis by reacting boric acid with compounds characterized by containing an amino group. Boric acid is an inorganic acid and while its formula is generally given as, $H_3BO_3$, it is not considered to react as a polybasic acid and upon heating it to relatively low temperatures, it easily gives up one molecule of water and thereafter reacts according to the general formula for metaboric acid ($HBO_2$). Its reactions in aqueous solutions have been frequently shown by physical chemical measurements to indicate the formula $HBO_2$ rather than $H_3BO_3$. The organic esters of boric acid indicate an acid or composition $HBO_2$ rather than $H_3BO_3$. All chemical information indicates that boric acid $H_3BO_3$ is really a hydrate of the acid $HBO_2$, and is to be looked upon as $HBO_2—H_2O$.

In carrying out the invention, I heat at 100 to 200° C., one or more mols of boric acid with urea or a substituted urea of the following general formula:

In this formula, $z$ is a small integer of values from 0 to 3, and in which R is a group of the following type:

Where $s$ and $t$ are small integers in which $s$ varies from 0 to 5 and $t$ from 2 to 6. X may represent one of several types of groups such as hydrogen, a simple or branched alkyl chain containing not over 5 carbons in which one or more hydroxyl or amino groups appear. X may also stand for alkyl polyamino chains or simple amino radicals such as $—(CH_2)_n—[NH(CH_2)_m]_p—OH$ or

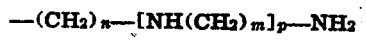

in which $m$, $n$ and $p$ are small integers, with $n$ varying from 2 to 6 $p$ from 0 to 6 and $m$ from 2 to 3. Resins made from reactions from these types are all found to be thermoplastic, and vary from soft to hard consistency. The resins which are made from ureas where the two X's become hydrogens are not suitable as textile sizing ingredients, inasmuch as these forms are invariably hard and brittle.

Suitable amino compounds for condensing with urea, forming various substituted ureas which may be then reacted with boric acid to secure water soluble resins, are as follows: monoethanolamine, diethanolamine, mono and di-isopropanolamine, ethylene diamine, diethylene triamine, dipropylene triamine, triethylene tetramine, tetraethylene pentamine, heptaethylene octamine, hexapropylene heptamine, hexamethylene diamine, 2-amino-2-ethyl-1,3 propanediol, 2-amino-2-methyl-1-propanol, 2-amino-2-methyl-1,3-propanediol, trimethylol amino methane, 2-amino-2-methyl-1-butanol, 2-amino-1-pentanol and hydroxy ethyl ethylene diamine.

The complex polyamino compounds, such as heptaethylene octamine, hexapropylene heptamine and other similar long chain compounds, may be easily synthesized by reaction of alkyl dihalides and organic amines or other known methods of synthesis. By proper selection of the alkyl di-halides and amino compounds, various structures may be built up to obtain the desired characteristics of the final boric acid condensate.

The preparation of substituted ureas indicated in the list of suitable alkyl derivatives listed below is accomplished by heating molar proportions of urea and the amine or polyamine at temperatures between 100–150° C. As an illustration of this, 60 parts of urea were heated with 61 parts of monoethanolamine at temperatures between 100–150° C. Liberation of ammonia was observed at 110–115° C. and after ½ hour at 130° C. one mole of ammonia was split out. The temperature was raised to 150° C. in order to remove the last traces of ammonia, at which point monoethanol urea was obtained. Various amines may be substituted for the monoethanolamine illustrated above, either a mono or a di substituted urea being obtained depending upon the proportion of urea to amine used.

It is not necessary that the two X's be alike. Suitable urea compounds for condensations with boric acid to secure water soluble resins are as follows:

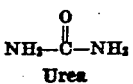
Urea

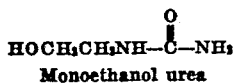
Monoethanol urea

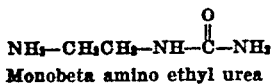
Monobeta amino ethyl urea

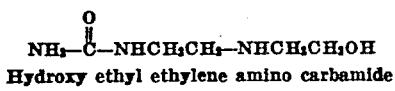
Hydroxy ethyl ethylene amino carbamide

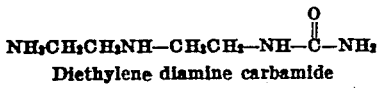
Diethylene diamine carbamide

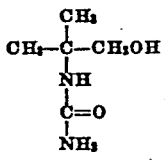
2-methyl, 2-carbamide 1-propanol

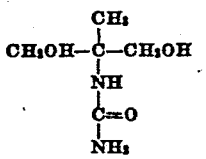
2-methyl, 2-carbamide 1,3-propanediol

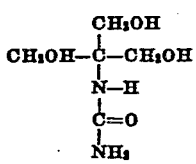
2-methylol, 2-carbamide 1-3 propanediol

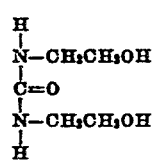
Symmetrical diethanol urea

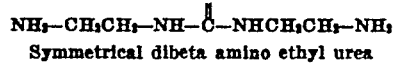
Symmetrical dibeta amino ethyl urea

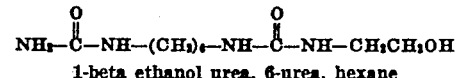
1-beta ethanol urea, 6-urea, hexane

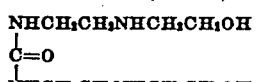
Symmetrical hydroxy ethyl ethylene amine carbamide

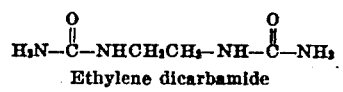
Ethylene dicarbamide

The detailed practice of the invention is illustrated by the following examples wherein the parts are given by weight:

*Example 1.*—62 parts of boric acid (1 mol) were mixed with 104 parts (1 mol) of monoethanol urea and gradually heated until water was collected in the sidearm tube. Heating was continued until 160° C., at which point two mols of water were split out and the residue in the flask cooled down. This yielded a water soluble viscous resin which was soft, practically colorless or slightly yellow, transparent, and slightly hygroscopic in nature. The resin is readily soluble in water and from such aqueous solutions the resin can be again secured by drying down, thus indicating that the product is stable and does not hydrolyze. The water solutions can be kept without any apparent evidence of change. The resin is easily softened on heating and is permanently thermoplastic.

Cotton warps were sized in a solution which was prepared by boiling 30# of potato starch, 7½# of fatty glycerides, 2½# soda ash, 100 gallons of water and 3# of the above water soluble resin. The warp yarns thus sized showed a smooth hard surface, did not fray during weaving and the looms operated at high efficiency.

*Example 2.*—176 parts of symmetrical dibeta amino ethyl urea

(1 mol), prepared by heating two mols of ethylene diamine and one mol of urea at temperatures between 100–150° C. for one half hour at the end of which two mols of ammonia had been liberated, were mixed with 62 parts of boric acid (1 mol) and gradually heated until water was collected in the sidearm tube. Heating was continued until 195° C., at which point two mols of water were split out and the residue in the flask cooled down. This yielded a hard, white to amber resin, water soluble and nonhygroscopic in nature. The resin is readily soluble in water and from such aqueous solutions the resin can be again secured by drying down, thus indicating that the product is stable and does not hydrolyze. The water solutions can be kept without any apparent evidence of change.

*Example 3.*—62 parts of boric acid (1 mol) were mixed with 148 parts of 2-methyl, 2-carbamide, 1,3 propanediol

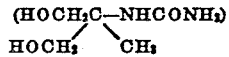

(1 mol) and gradually heated until water was collected in the sidearm tube. Heat was continued until 195° C. at which point two mols of water were split out and the residue in the flask cooled down. This yielded a hard, red resin, water soluble, transparent and nonhygroscopic in nature. The resin is readily soluble in water and from such aqueous solutions the resin can again be secured by drying down, thus indicating that the product is stable and does not hydrolyze. The water solutions can be kept without any apparent evidence of change. The resin is easily softened on heating and is permanently thermoplastic.

Rayon yarns sized in a bath containing a solution of 4% gelatin and 1% of the above described water soluble resin were satisfactory for weaving, showing good strength and little fly.

*Example 4.*—146 parts of ethylene diamine dicarbamide (NH₂CONHCH₂CH₂NHCONH₂) (1 mol) were mixed with 62 parts of boric acid (1 mol) and gradually heated until water was collected in the sidearm tube. Heating was continued until 180° C., at which point 1½ mols of water were split out and the residue in the flask cooled down. This residue yielded a water soluble, hard, white resin, nontransparent and hygroscopic in nature. The resin is readily soluble in water and such solutions can be kept without any evidence of change.

*Example 5.*—62 parts of boric acid (1 mol) were mixed with 362 parts (1 mol) of an alkyl polyamino substituted urea of the following formula:

and gradually heated to 140° C., at which point 2 mols of water were split out and the residue in the flask cooled down. The alkyl polyamino substituted urea was obtained by heating equimolar quantities of monoethanol urea and symmetrical dibeta amino ethyl urea for one half hour at 130-140° C. during which time one mol of ammonia was liberated. The mixture was then cooled to 100° C. and one mol of ethylene diamine dicarbamide added and the temperature slowly raised to 150° C., ammonia being liberated and the substituted urea indicated in the above formula secured. The resin obtained was water soluble, hard and practically nonhygroscopic. Water solutions of this resin are stable, with no boric acid hydrolyzing.

*Example 6.*—246 parts (1 mol) of 1-beta ethanol urea, 6-urea hexane were mixed with 62 parts of boric acid (1 mol) and gradually heated until water was collected in the sidearm tube. Heating was continued until 140-150° C., at which point 2 mols of water were split out and the flask cooled down to room temperature. The 1-beta ethanol urea, 6-urea hexane was prepared by heating equimolar quantities of monoethanolurea and hexamethylene diamine to 130-140° C. during which time 1 mol of ammonia was liberated. The mixture was then cooled to 100° C. and 1 mol of urea added, the batch temperature then being slowly raised to 150° C. during which one mol of ammonia was liberated and the substituted urea indicated above was secured. The resin obtained was water soluble, slightly yellow and transparent in nature. Its water solutions were stable over long periods of time, indicating no hydrolysis on storage.

Printed draperies may be finished and given an added body and stiffness by running the fabric through a bath containing 15# of corn dextrin dissolved in 100 gallons of water along with 5# of the above described water soluble resin.

*Example 7.*—62 parts of boric acid (1 mol) were mixed with 261 parts (1 mol) of a poly alkyl amino substituted urea having the following formula:

and the mixture heated to 140-150° C., at which point 2 mols of water were collected in the sidearm tube. The above polyalkyl amino substituted urea was secured by heating equimolar quantities of monoethanolurea and dipropylene triamine for one half hour at 130-135° C., after which time ammonia was liberated. The charge was then cooled to 100° C. and one mol of urea added after which the temperature was slowly raised to 150° C., ammonia being liberated and the substituted urea obtained. The resinous condensation obtained was light amber, transparent and nonhygroscopic in nature. It was easily water soluble and from such aqueous solutions the resin can be again secured by drying down, thus indicating that the product is stable and does not hydrolyze. The resin itself is easily softened on heating and is permanently thermoplastic.

*Example 8.*—62 parts of boric acid (1 mol) were mixed with 319 parts (1 mol) of a poly alkyl substituted urea of the following formula:

and gradually heated until water was collected in the sidearm tube. Heating was continued until 180° C., at which point 2 mols of water were split out and the residue in the flask cooled. The substituted urea was obtained by the same procedure as in Example 7 with the exception that tetraethylene pentamine was substituted for dipropylene triamine. This yielded a hard, practically water white resin, water soluble, transparent and nonhygroscopic in nature. The water solutions can be kept without any apparent evidence of change.

In sizing sewing threads and twines, it is essential to secure a hard smooth surface which at the same time is flexible. Threads and twines sized with a composition prepared by boiling 100 gallons of water, 50# of tapioca dextrin, 10# of talc and 10# of the water soluble resin described above, gave a very satisfactory sized thread and twine.

*Example 9.*—62 parts of boric acid (1 mol) were mixed with 405 parts (1 mol) of a poly alkyl substituted urea of the following formula:

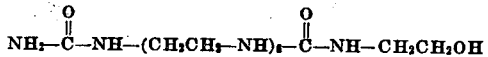

and gradually heated until water was evolved. Heating was continued until 170° C. was reached, at which point approximately 2 mols of water were split out and the residue in the flask cooled. The substituted urea was obtained by the same procedure as in Example 7 with the exception that hexaethylene heptamine was substituted on an equimolar basis for dipropylene triamine. The resin obtained was readily water soluble and stable for storage. The condensate was hard, transparent and nonhygroscopic in nature.

*Example 10.*—174 parts of a substituted urea, obtained by condensing at temperature between 125–135° C. equal molar quantities of urea and dipropylene triamine, were mixed with 62 parts of boric acid (1 mol) and gradually heated until water was evolved. Heating was continued until 180° C., at which point 1½ mols of water were split out and the residue cooled. This yielded a water soluble viscous resin, light yellow, transparent and slightly hygroscopic. The resin is readily soluble in water and from such aqueous solutions may be again secured by drying down, thus indicating that the product is stable and does not hydrolyze.

Cotton cloth may be satisfactorily back-sized by impregnating the cloth or fabric through a quetch, squeeze roll and drying machine in which the sized solution is made up by boiling in 100 gallons of water 130# of corn starch, 225# of talc, 50# saponified tallow and 20# of the above described water soluble resin. The cotton fabric thus back-filled or sized possesses a firm finish in which the starch does not dust off due to the binding characteristics of the water soluble resin.

*Example 11.*—203 parts (1 mol) of a substituted urea of the following formula:

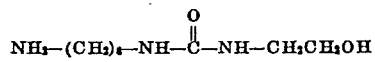

were mixed with 62 parts (1 mol) boric acid and heated to 160° C. at which point 2 mols of water were split out and the residue in the flask cooled to room temperature. The substituted urea indicated above was obtained by heating equimolar quantities of monoethanolurea and hexamethylene diamine at temperatures between 130–140° C. for one half hour during which time ammonia was liberated. The resin obtained was practically water white, transparent and slightly hygroscopic in nature. It is easily water soluble and from such aqueous solutions no boric acid hydrolyzes under long standing.

*Example 12.*—62 parts of boric acid (1 mol) were mixed with 362 parts (1 mol) of a poly amino alkylol substituted urea of the following formula:

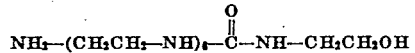

and gradually heated in a flask until water was collected in the sidearm tube. Heating was continued to 175° C., at which point 2 mols of water were split out and the residue cooled. The poly amino alkylol substituted urea indicated above was obtained by heating equimolar quantities of hexaethylene heptamine and monoethanolurea at temperatures between 130–135° C. during which time 1 mol of ammonia was liberated. This yielded a water soluble, viscous resin, light yellow and transparent. The water solutions are stable with no boric acid hydrolyzing on standing.

*Example 13.*—62 parts of boric acid (1 mol) were mixed with 276 parts (1 mol) of a polyamino alkylol substituted urea of the following formula:

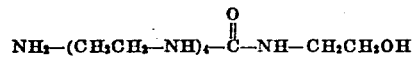

and gradually heated in a flask until water was collected in the sidearm tube. Heating was continued to 175° C., at which point 2 mols of water were split out and the residue cooled. The polyamino alkylol substituted urea indicated above was obtained by heating equimolar quantities of tetraethylene pentamine and monoethanolurea for one half hour at 130–135° C. during which time one mol of ammonia was liberated. This yielded a water soluble, viscous resin, light yellow and transparent. The water solutions are stable with no boric acid hydrolyzing on standing.

*Example 14.*—145 parts (1 mol) of 5-amino amyl urea were mixed with 62 parts (1 mol) of boric acid and heated to 170° C., at which point 2 mols of water were split out and the residue in the flask cooled. The resinous condensation obtained was practically water white, viscous, transparent and nonhygroscopic in nature. Its water solutions are stable on long standing and from such aqueous solutions a resinous film may again be secured by evaporation.

The above examples are given only by way of illustrations, and the use of various other substituted alkyl ureas carrying hydroxyl or amino groups result in various similar types of resinous products. In view of the fact that water and some ammonia are split out by the reaction of boric acid with either amino or hydroxyl groups, it is to be presumed that the resinous products are formed in this manner. It is apparent that the high polymeric chain resins formed must be rather complex chemical formulas and it is not our intention in offering these suggested reactions as the source of the water and ammonia eliminated that this is necessarily the only type of combination which occurs and this application is not to be limited in terms of this type of interpretation.

The above descriptions and examples are intended to illustrate the nature of this invention, but the invention is not restricted to these examples.

I claim:

1. The process for the manufacture of water soluble resins which consists of condensing at temperatures of 100° to 200° C. equimolar quantities of boric acid and a compound of the following general formula:

wherein $z$ is a small integer of values from 0 to 3 and R is a group $-(CH_2)_t-[NH(CH_2)_t]_s-$ where $s$ and $t$ are small integers with $s$ ranging from 0 to 5 and $t$ from 2 to 6 and X is a radical selected from the group consisting of hydrogen,

and

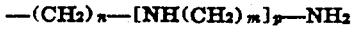

in which $m$, $n$ and $p$ are small integers with $n$ varying from 2 to 6, $p$ from 0 to 6 and $m$ from 2 to 3.

2. The process for forming a water soluble resin by condensing equimolar quantities of boric acid and monoethanol urea at temperatures between 100° and 200° C.

3. The process for forming a water soluble resin by condensing equimolar quantities of boric acid and hydroxy ethyl ethylene amino carbamide at temperatures between 100° and 200° C.

4. The process for forming a water soluble resin by condensing equimolar quantities of boric acid and 2-methyl-2-carbamide 1-propanol at temperatures between 100° and 200° C.

5. A water soluble resinous condensation product of reactants secured by condensing at temperatures of from 100° to 200° C. equimolar quantities of boric acid and a compound of the following general formula:

$$X-NH-\overset{O}{\underset{\|}{C}}-(NH-R-NH-\overset{O}{\underset{\|}{C}})_z-NH-X$$

wherein $z$ is a small integer of values from 0 to 3 and R is a group $-(CH_2)_t-[NH(CH_2)_t]_s-$ where $s$ and $t$ are small integers in which $s$ varies from 0 to 5 and $t$ from 2 to 6 and X represents a radical selected from the group consisting of hydrogen, $$-(CH_2)_n-[NH(CH_2)_m]_p-OH$$

and $$-(CH_2)_n-[NH(CH_2)_m]_p-NH_2$$

in which $m$, $n$ and $p$ are small integers with $n$ varying from 2 to 6, $p$ from 0 to 6 and $m$ from 2 to 3.

6. A water soluble resinous condensate of equimolar quantities of boric acid and monoethanol urea, condensed at temperatures between 100° and 200° C.

7. A water soluble resinous condensate of equimolar quantities of boric acid and hydroxy ethyl ethylene amino carbamide formed by condensing at temperatures between 100° and 200° C.

8. A water soluble resinous condensate of equimolar quantities of boric acid and 2-methyl-2-carbamide 1-propanol formed by condensing at temperatures between 100° and 200° C.

9. Textile material sized with a composition in which the binder consists of a water soluble resin secured by the reaction at temperatures of from 100° to 200° C. equimolar quantities of boric acid and a compound of the following general formula:

$$X-NH-\overset{O}{\underset{\|}{C}}-(NH-R-NH-\overset{O}{\underset{\|}{C}})_z-NH-X$$

wherein $z$ is a small integer of values from 0 to 3 and R is a group $-(CH_2)_t-[NH(CH_2)_t]_s-$ where $s$ and $t$ are small integers in which $s$ varies from 0 to 5 and $t$ from 2 to 6 and X represents a radical selected from the group consisting of hydrogen, $$-(CH_2)_n-[NH(CH_2)_m]_p-OH$$

and $$-(CH_2)_n-[NH(CH_2)_m]_p-NH_2$$

in which $m$, $n$ and $p$ are small integers with $n$ varying from 2 to 6, $p$ from 0 to 6 and $m$ from 2 to 3.

10. Textile material sized with a composition in which the binder consists of a water soluble resin secured by the reaction of equimolar quantities of boric acid and monoethanol urea at temperatures between 100° and 200° C.

11. Textile material sized with a composition in which the binder consists of a water soluble resin secured by the reaction of equimolar quantities of boric acid and hydroxy ethyl ethylene amino carbamide at temperatures between 100° and 200° C.

12. Textile material sized with a composition in which the binder consists of a water soluble resin secured by the reaction of equimolar quantities of boric acid and 2-methyl-2-carbamide 1-propanol at temperatures between 100° and 200° C.

WILLARD L. MORGAN.

No references cited.